United States Patent Office 3,642,888
Patented Feb. 15, 1972

3,642,888
PROCESS FOR PREPARING β-ALANINE
Yoshinari Matsui, Tokyo, and Minoru Hara and Yoshioki Komachiya, Kanagawa-ken, Japan, assignors to Ajinomoto Co., Inc., Tokyo, Japan
No Drawing. Filed Jan. 9, 1969, Ser. No. 790,167
Claims priority, application Japan, Jan. 11, 1968, 43/1,116
Int. Cl. C07c 101/08
U.S. Cl. 260—534 C      3 Claims

ABSTRACT OF THE DISCLOSURE

β-Alanine is obtained in good yield from bis-(carboxyethyl)amine by the reaction with aqueous ammonia in the presence of an alkali or alkaline earth metal hydroxide at an elevated temperature in a pressure vessel. It is also obtained in good yield by treating the reaction mixture resulting from the reaction of bis-(carboxyethyl)amine and aqueous ammonia with an alkali or alkaline earth metal hydroxide under heating.

BACKGROUND OF THE INVENTION

The present invention relates to a process for preparing β-alanine, and more particularly, to an improved process for preparing β-alanine from bis-(carboxyethyl)amine (hereinafter, referred to as BCA).

Various processes have been hitherto proposed to prepare β-alanine which is an important intermediate in the preparation for pantothenic acid or which itself is useful as a monomer for preparing poly-β-alanine. The commerically practicable prior art processes involve (1) the preparation of β-alanine by the reaction of acrylic acid, a lower alkyl ester thereof or acrylamide and ammonia or ammonium hydroxide at an elevated temperature under superatmospheric pressure, and (2) the preparation of β-alanine by the reaction of acrylonitrile and ammonia or ammonium hydroxide at an elevated temperature under superatmospheric pressure and subsequent hydrolysis of the resultant β-aminopropionitrile with an alkali or alkaline earth metal hydroxide (see, U.S. Pat. Nos. 2,819,303 and 2,376,334, F. Proppelsdorf, R. C. Lemen; J. Org. Chem., 26, 262–3 (1961), D. S. Nestreruk; Przemysl, Chem., 44, 85–7 (1965), J. H. Ford et al.: J. Am. Chem. Soc., 69, 844–6 (1947)).

In these prior art processes, however, in addition to β-alanine, a considerable amount of BCA is formed and contaminates the desired β-alanine. Therefore, the greatest problem in the prior art processes on a commercial scale is how to utilize this by-product effectively.

U.S. Pat. No. 2,416,630 describes a process for preparing β-alanine from BCA by heating it together with an excess of aqueous ammonia at a temperature from 180° C. to 225° C. in a pressure vessel. However, β-alanine is isolated in a normal yield of only 30 percent and the reaction yield does not exceed 70 percent even when the concentration of BCA in the reaction system is reduced to vary little and the molar ratio of ammonia to BCA is high. Moreover, according to the present inventors' experimental results, a variety of by-products such as β-alanyl, β-alanine, β-alanine amide, BCA-amide and BCA-hemiamide are produced simultaneously when BCA is heated together with an excess of aqueous ammonia. It is very difficult to remove these by-products from the reaction mixture and they interfere with crystallization of the desired product and therefore, crude β-alanine crystals crystallize in a low yield from the reaction mixture.

Accordingly, the principal object of the present invention is to provide an improved process for preparing pure β-alanine in good yield without any by-products from BCA.

SUMMARY OF THE INVENTION

We have now found that β-alanine may be obtained in good yield by reacting BCA and aqueous ammonia in the presence of an alkali or alkaline earth metal hydroxide at an elevated temperature, or by heating an alkali or alkaline earth metal hydroxide with the mixture resulting from the reaction of BCA and aqueous ammonia at an elevated temperature. That is, the present invention is a process for preparing β-alanine which comprises adding an alkali or alkaline earth metal hydroxide to the reaction system during or after the reaction of BCA with aqueous ammonia, and heating the mixture so obtained at an elevated temperature until β-alanine is formed without accompanying by-product.

The preferred concentration of aqueous ammonia may be more than 10 percent. Ordinarily, commercial 28% or concentrated aqueous ammonia is employed. Of course, more concentrated mixtures of liquid ammonia and 28% aqueous ammonia may also be employed. A large excess especially more than 10 moles of ammonia per mole of BCA is employed.

Suitable alkali or alkaline earth metal hydroxides include sodium hydroxide, potassium hydroxide, calcium hydroxide and the like. They are used in an amount of 2 equivalents or more as base per mole of the BCA employed. However, it is desirable to avoid the use of a large excess of alkali or alkaline earth metal hydroxide to facilitate separation of β-alanine from the reaction mixture after completion of the reaction.

When β-alanine is prepared in a single step by heating a mixture of BCA, aqueous ammonia and alkali or alkaline earth metal hydroxide, the reaction temperature may be between 130° C. and 200° C., and the reaction time may be between about 1 and 8 hours. When β-alanine is prepared by first reacting BCA and aqueous ammonia according to the known process and then treating the reaction mixture with an alkali or alkaline earth metal hydroxide at elevated temperature, the first reaction step may be conducted at 130° C. to 200° C. for about one to five hours, and alkali treatment, the next step, may be carried out at reflux temperature for about thirty minutes to two hours. In either case, the presence of an alkali or alkaline earth metal hydroxide suppresses the formation of all by-products. The excess of ammonia, inorganic materials and a small amount of the unreacted BCA may be easily removed from the reaction mixture in a conventional manner. For example, the excess of ammonia is removed by stripping, and the residual solution free from ammonia is passed through a column containing strongly acidic ion exchange resin, whereby the inorganic alkali or alkaline earth metal ions, the unreacted BCA and β-alanine are absorbed on said ion exchange resin. Thereafter, diluted aqueous ammonia is passed through said ion exchange resin column in order to elute both β-alanine and BCA. After removal of ammonia from the eluate, the residue is passed through a weakly basic ion exchange resin column by which BCA is completely absorbed. The effluent from the last-mentioned ion exchange resin column is essentially a pure aqueous solution of β-alanine.

Direct crystallization of β-alanine from the reaction mixture is not impossible in the present invention. However, in most cases the yield and purity of the desired β-alanine are reduced by inorganic materials present. Therefore, it is desirable to remove the inorganic materials as much as possible by a strongly acidic ion exchange resin treatment prior to the crystallization of β-alanine.

According to the present invention, β-alanine of high purity may be obtained in yields of more than 75%.

BCA is used as a raw material in the present process, but it is regarded as a by-product in the reaction mixture when β-alanine is prepared from acrylic compounds or acrylonitrile, as already mentioned. Accordingly, as the BCA source, the reaction mixture of the prior art processes may be advantageously used in the present invention. Isolation of BCA from the reaction mixture is readily accomplished in the following procedure: after β-alanine has been crystallized from the reaction mixture, the mother liquor is subjected to contact with a weakly basic ion exchange resin and the absorbed BCA is eluted from the ion exchange resin with diluted aqueous ammonia.

The present process may be advantageously carried out to prepare β-alanine from BCA in itself. However, the present process may be combined with the prior art processes for preparing β-alanine from acrylic compounds or acrylonitrile. For example, β-alanine may be prepared in high yield by combining the following three steps; the first step comprises reacting acrylic compounds with ammonia, and recovering β-alanine from the reaction mixture; the second step comprises applying the present process to the mother liquor of the first step to produce further β-alanine from the considerable amount of BCA present therein, and recovering β-analine from the reaction mixture; and the third step comprises mixing the mother liquor of the second step with a necessary amount of ammonia and an additional amount of the acrylic compounds depending on the total amount of β-alanine recovered in the first and second steps, and recycling the mixture to the first step.

In the present process, it is recommended that the mother liquor stripped of inorganic materials and the desired product or its evaporation residue be recycled without separating the unreacted BCA therefrom. By such an operation, β-alanine of high quality may be continuously obtained in higher yield.

DESCRIPTION OF PREFERRED EMBODIMENTS

The following examples illustrate the process of the present invention: Parts are by weight unless otherwise stated.

Example 1

80.6 parts of BCA, 1890 parts of 28% aqueous ammonia and 48 parts of sodium hydroxide were heated in an autoclave at 180° C. for five hours. After ammonia was removed from the reaction solution by distillation under reduced pressure, the residual solution was passed through a column packed with Diaion SKIB (strongly acidic anion exchange resin in the hydrogen form). Thereafter 2 N aqueous ammonia was passed through the column and the effluent was distilled under reduced pressure to remove ammonia. The residue was thereafter passed through a column packed with Amberlite IRA–68 (weakly basic cation exchange resin in the hydroxyl form). The effluent of the cation exchange resin was concentrated to precipitate β-alanine crystals. Said effluent gave a single spot of β-alanine only on the paper chromatogram. 72.2 parts of β-alanine crystals was obtained. The yield was 82%, based on the BCA employed.

When 2 N-aqueous ammonia was passed through the cation exchange resin column an effluent containing 14.5 parts unreacted BCA (18%, based on the BCA employed) was obtained. Therefore, the yield of β-alanine was substantially 100%, based on the consumed BCA.

Example 2

The procedure of Example 1 was repeated, except that twice the amount of 28% aqueous ammonia was employed. The yield of β-alanine obtained was 89%, based on the BCA employed. And the recovery rate of BCA was 11%. Therefore, the yield of β-alanine, based on the consumed BCA was 100%.

Example 3

The procedure of Example 1 was repeated except that 134.4 parts of calcium hydroxide was employed in place of sodium hydroxide. The yield of β-alanine obtained was 79%, based on the BCA employed, and the recovery rate of BCA was 21%. Therefore, the yield of β-alanine with respect to the consumed BCA was 100%.

Example 4

80.6 parts of BCA, 1890 parts of 28% aqueous ammonia and 89 parts of calcium hydroxide were heated in an autoclave at 200° C. for four hours. After gaseous ammonia was removed from the reaction solution by distillation under reduced pressure, 123 parts of 98% concentrated sulfuric acid was added to the residue to precipitate calcium sulfate. The precipitate of calcium sulfate was filtered off and the filtrate was treated with a weakly basic cation exchange resin as in Example 1 and β-alanine was recovered. The yield of β-alanine obtained was 80%, based on the BCA employed and the recovery rate of BCA was 20%. Therefore, the yield of β-alanine was 100% with respect to the consumed BCA.

Example 5

80.6 parts of BCA and 1890 parts of 28% aqueous ammonia were heated in an autoclave at 130° C. for twenty hours and then 48 parts of sodium hydroxide was added thereto. The mixture was further heated at 130° C. for one hour. The reaction mixture was treated with ion exchange resins as in Example 1. The yield of β-alanine was 81% and the recovery rate of BCA was 19%. Therefore, the yield of β-alanine was 100% with respect to the consumed BCA.

Example 6

80.6 parts of BCA and 1890 parts of 28% aqueous ammonia were heated in an autoclave at 160° C. for two hours. After ammonia was removed from the reaction mixture by distillation under reduced pressure, the residue was passed through a column packed with Amberlite IRA–68 (weakly basic cation exchange resin). The effluent was concentrated under reduced pressure until crude β-alanine crystallized out. The absorbed constituents were eluted from the cation exchange resin with 2 N aqueous ammonia, and the eluate was evaporated to dryness in vacuo. To the dry residue were added 1890 parts of 28% aqueous ammonia and as much BCA needed to supply the amount of β-alanine separated. The mixture was used as the starting material in another operation, and the same procedure was repeated many times (recycle operation A).

After ammonia was removed from the reaction mixture resulting from the reaction of BCA and aqueous ammonia in the above recycle operation A, the residue was mixed with 48 parts of sodium hydroxide and the mixture was heated at reflux temperature for one hour. The reaction mixture was passed through a column packed with Diaion SKIB (strongly acidic anion exchange resin) to absorb β-alanine, BCA and sodium ion and thereafter 2 N aqueous ammonia was passed through said anion exchange resin column to elute BCA and β-alanine. After ammonia was completely removed from the eluate, the residual solution was passed through a column packed with Amberlite IRA–68. The subsequent procedures were carried out according to the recycle operation A (recycle operation B).

Table 1 shows the respective results obtained when β-alanine was prepared according to the two recycle operations.

As shown in Table 1, in recycle operation A wherein the reaction of BCA and aqueous ammonia was carried out in the absence of sodium hydroxide, the yield and purity of β-alanine crystals obtained are inferior in comparison with the recycle operation B and the remaining amount of dry residue increases, as the number of cycles increases and the maximum permissible number of cycles is only four. In the recycle operation B wherein the reaction was carried under the influence of sodium hydroxide, the yield and the purity of the β-alanine obtained are satisfactory but the amount of dry residue is approximately constant regardless of number of cycles and more than fourteen cycles may be easily carried out.

bis(carboxyethyl)amine values present in said mixtures after said recovery of β-alanine with aqueous ammonia and an alkali metal or alkaline earth metal hydroxide at elevated temperature until additional β-alanine is formed.

TABLE 1

| Recycle Number | Recycle operation A | | | | | Recycle operation B | | | | |
|---|---|---|---|---|---|---|---|---|---|---|
| | Crystal yield, percent | Crystal purity, percent | Real yield, percent | Ratio of dry residue | P.P.C. | Crystal yield, percent | Crystal purity, percent | Real yield, percent | Ratio of dry residue | P.P.C. |
| Original | 67.2 | 96.0 | 64.5 | 100.0 | + | 79.6 | 99.5 | 79.2 | 100.0 | − |
| 1 | 83.8 | 95.0 | 79.7 | 121.3 | ++ | 98.5 | 99.6 | 98.1 | 101.4 | − |
| 2 | 91.2 | 94.8 | 86.5 | 156.7 | +++ | 102.3 | 99.9 | 102.2 | 97.6 | − |
| 3 | 90.3 | 92.8 | 83.9 | 157.3 | +++ | 98.8 | 99.7 | 98.5 | 96.9 | − |
| 4 | 117.0 | 90.8 | 106.5 | 176.2 | +++ | 101.0 | 99.8 | 100.8 | 96.5 | − |
| 5 | | | | | | 96.0 | 99.6 | 95.6 | 111.8 | − |
| 6 | | | | | | 103.0 | 99.7 | 102.7 | 102.8 | − |
| 7 | | | | | | 100.7 | 99.9 | 100.6 | 101.7 | − |
| 8 | | | | | | 103.0 | 99.7 | 102.7 | 94.5 | − |
| 9 | | | | | | 97.6 | 99.8 | 99.4 | 103.8 | − |
| 10 | | | | | | 100.6 | 99.8 | 100.4 | 104.5 | − |
| 11 | | | | | | 100.5 | 99.6 | 100.1 | 90.0 | − |
| 12 | | | | | | 100.0 | 99.9 | 99.9 | 93.4 | − |
| 13 | | | | | | 98.6 | 99.8 | 98.4 | 93.1 | − |
| 14 | | | | | | 101.0 | 99.9 | 100.9 | 89.3 | − |
| Average (1) | 95.6 | 93.4 | 87.7 | 152.9 | | 100.2 | 99.8 | 100.0 | 98.1 | − |
| Average (2) | | | | | | 100.1 | 99.8 | 99.9 | 98.4 | − |

NOTE.—1. Crystal yield: calculated as molar ratio of the β-alanine crystals isolated to the BCA supplied in a given recycle system. 2. Crystal Purity: calculated from the nitrogen content of the β-alanine crystals determined according to the Van Slyke method. 3. Real yield: The product of crystal yield and the crystal purity. 4. Ratio of dry residue: divided the amount of dry residue obtained in a given recycle system by the amount of dry residue obtained from the uncrystallized residue of the original system. 5. P.P.C.: the intensity of impurity content in β-alanine crystal which detected on the paper chromatogram wherein the sign of + is positive and the sign of − is negative. 6. Average (1): average value of recycle numbers 1 to 4.7. Average (2): average value of recycle numbers 1 to 14.

What we claim is:

1. In a process for preparing β-alanine by holding a mixture of bis(carboxyethyl)amine and aqueous ammonia at an elevated temperature until said β-alanine is formed, the improvement which comprises adding to said mixture an alkali metal or alkaline earth metal hydroxide in an amount of at least two base equivalents per mole of said bis(carboxyethyl)amine, and holding the mixture containing said metal hydroxide at an elevated temperature and for a time sufficient to make said mixture substantially completely free of β-alanyl-β-alanine, β-alanine amide, bis(carboxyethyl)amine amide, and bis(carboxyethyl)amine hemiamide.

2. In a process as set forth in claim 1, recovering crystalline β-alanine from said mixture after said hydrolyzing.

3. In a process as set forth in claim 2, reacting residual

References Cited
UNITED STATES PATENTS

| 3,105,092 | 9/1963 | Popplelsdorf | 260—534 C |
| 2,819,303 | 1/1958 | Griffith et al. | 260—534 C |
| 2,416,630 | 2/1947 | Kirk | 260—534 C |
| 2,376,334 | 5/1945 | Babcock et al. | 260—534 C |

OTHER REFERENCES

Noller: Chemistry of Org. Compounds, 1965, p. 269.

LORRAINE A. WEINBERGER, Primary Examiner

J. L. DAVISON, Assistant Examiner

U.S. Cl. X.R.

260—534 E